United States Patent [19]

Corthout

[11] Patent Number: 5,134,688
[45] Date of Patent: Jul. 28, 1992

[54] COMPUTER METHOD AND AN APPARATUS FOR GENERATING A DISPLAY PICTURE REPRESENTING A SET OF OBJECTS INCLUDING A BRUSH ELEMENT

[75] Inventor: Marc E. A. Corthout, Eindhoven, Netherlands

[73] Assignee: U.S. Philips Corporation, New York, N.Y.

[21] Appl. No.: 624,465

[22] Filed: Dec. 7, 1990

Related U.S. Application Data

[63] Continuation of Ser. No. 384,226, Jul. 21, 1989, abandoned, which is a continuation-in-part of Ser. No. 197,077, May 20, 1988, abandoned.

[51] Int. Cl.⁵ .............................................. G06F 5/62
[52] U.S. Cl. ................................................... 395/142
[58] Field of Search ........... 364/518, 521, 526, 167.01; 340/706, 707, 710, 747; 382/55; 395/141–143

[56] References Cited

U.S. PATENT DOCUMENTS

| | | | |
|---|---|---|---|
| 4,633,46 | 12/1986 | Walker | 340/710 X |
| 4,514,818 | 4/1985 | Walker | 340/710 X |
| 4,631,690 | 12/1986 | Corthout et al. | 364/518 |
| 4,706,200 | 11/1987 | Kishi et al. | 364/167.01 X |

*Primary Examiner*—Gary V. Harkcom
*Assistant Examiner*—Mark K. Zimmerman
*Attorney, Agent, or Firm*—Anne E. Barschall

[57] ABSTRACT

A computer method and apparatus for combining a brush object element with a trajectory object element in a graphics display system. The brush has a reference point that moves along a trajectory, and any point in application coordinates that is at any position covered by the brush, is assigned an -inside- indication. The trajectory may be non-closed or closed, in which latter case it may also govern an -inside- indication. The approach is point driven, which leads itself to acceleration by means of array calculations.

27 Claims, 7 Drawing Sheets

COMPUTER METHOD AND AN APPARATUS FOR GENERATING A DISPLAY PICTURE REPRESENTING A SET OF OBJECTS INCLUDING A BRUSH ELEMENT

This is a continuation of application Ser. No. 384,226, filed Jul. 21, 1989, now abandoned, which was a continuation-in-part of application Ser. No. 197,077, filed May 20, 1988, now abandoned.

BACKGROUND OF THE INVENTION

The invention relates to a computer method for generating a display picture representing a set of object elements including a brush object element. U.S. Pat. No. 4,631,690 to the same assignee, herein incorporated by reference, discloses a multiprocessor system for forming a color picture from object elements defined in a hierarchical data structure. The present invention is not restricted to a multilevel hierarchy. The present invention may be applied to a two-color system (e.g. black and white) and to a one-processor implementation. The state of the art shows that even for a complicated pictorial situation the number of calculation steps necessary for color-assignment to a particular pixel remains limited to a low average value. For the specific case of Bezier curves and shapes the calculation generally boils down to elementary shift and add operations that straightforwardly lead to a silicon implementation of the processing. The nature of the present approach is point-driven versus the conventional object-driven approach now generally in use. The present invention envisages the use of brushes. For conceptualization thereof, a Bezier curve is defined as a primitive element that is expressed by a Bezier formula. A path is a concatenation of curves; a path may be closed or non-closed. A path may consist of a single curve. A shape is described by one or more closed paths. A certain inside versus outside definition specifies the points of the shape.

For better explanation of the description to follow, the following three frames of references are specified:

first there are continuous or analog application coordinates in which the objects to be displayed are conceptually modelled; these will not be considered hereinafter;

second there are discrete application coordinates, which are used for computer models of these objects and for digital calculations to generate results that are to be displayed;

finally, discrete device coordinates specify pixels in the picture field to be displayed according to a particular color specification.

SUMMARY OF THE INVENTION

Among other things, it is an object of the invention to allow for realizing a brush superposition to a trajectory, wherein the trajectory is a path and to determine by means of elementary arithmetic operations an inside/-outside predicate for any display pixel and thereby, a color. The usefulness of such superposition may be one of the following.

a. according to a first field of use, the trajectory is the guiding line of the brush motion, whereas any pixel covered by the brush at any time gets an -inside- Boolean as distinct from any pixel never covered by the brush. Here, the trajectory is a non-rational Bezier curve, and the inside of the brush is a Bezier shape. The brush has an origin or reference point that moves along the trajectory. The area to be colored need not be defined in the form of a Bezier shape. The present invention allows for easy modelling of the trajectory, for a wide variety of applicable brush shapes and yet for easy implementation.

b. according to a second field of use, the trajectory is formed by the outline of characters and the like, that may be though of as relatively small trajectories with much tiny detail. A problem then occurs in that notwithstanding changes in magnification, such as dezooming, the characters must remain readable as long as possible. One attractive solution is using the character perimeter as a trajectory for the brush. All pixels being covered by the running brush get the same color as the rest of the character. In itself, the shape of the brush may be arbitrary. Thus, the character is dilated somewhat; in this way problems are avoided that could occur because of undersampling of narrow colored shapes during a high degree of dezooming. In this case, the trajectory must be a closed shape. If the trajectory is not a closed shape, the system of field a. prevails, that also mitigates extensive dezooming. For example, connecting lines between two blocks in a block diagram would retain connectivity. For correct solution of the dezooming problem, the dimension of the brush in digital application coordinates would be chosen so that it would correspond to be equal or nearly equal to the pixel periodicity. A particular advantage of this application is the easy implementability of elementary and locally applicable algorithms for anti-aliasing; anti-aliasing by itself is known in picture processing.

c. a third field of use is the testing of spatial coherence, that is testing a window for color uniformity. This coherence information allows for various strategic measures, such as deciding on whether an icon, sub-picture or other pictorial element when placed in this window would interfere with pre-existing information. In this case a brush is used that has a shape that corresponds to the window shape, but is inverted with respect to a predetermined window reference point. The new brush travels with its reference point along any relevant color edge in the picture and it is detected whether the brush ever touches the original reference point. If so, the window color is non-uniform. The course of action described is faster to execute than the reverse, wherein all window pixels would have to be interrogated in succession with respect to all Bezier paths.

Note that in all cases part of the trajectory may extend outside the viewing window. The display may be crt, liquid crystal, hard copy or otherwise. According to one aspect of the invention, the object is realized by a computer method for pixel-wise generating a display picture representing an object set of object elements, including a brush object element that is a Bezier shape to be moved with its guiding centre along a guiding trajectory that is a non-rational Bezier path included in said object set, said method comprising the steps of:

a. for each trajectory Bezier curve providing a trajectory set of trajectory control points in an associated coordinate-wise oriented trajectory curve bounding box and for each brush Bezier curve providing a brush set of brush control points in an associated brush curve bounding box, and providing a brush bounding box containing all points of the brush shape;

b. for each pixel determining application coordinate values regarding any relevant object element for an actual point corresponding to that pixel, and then dilating each respective trajectory curve bounding box with the brush bounding box to a dilated box and
c. in a determination procedure determining for said actual point either:
   c1. actual point outside dilated box then reject trajectory curve in question and go to another trajectory curve, or
   c2. actual point inside brush bounding box when brush guiding centre positioned in either end point of actual trajectory curve, then execute brush procedure with respect to such end point, but
   c3. otherwise execute a division procedure on the trajectory Bezier curve in question and take any part as secondary trajectory Bezier curve, for processing in said determination procedure;
d. in the brush procedure for any brush Bezier curve determining for said actual point either:
   d1. actual point outside brush curve bounding box, then go to intersection procedure, or
   d2. actual point coincides with any brush Bezier curve end point, then exit to assignment operation, or
   d3. all control points of brush Bezier curve lie in a 2×2 discrete point square, then goto intersection procedure, but
   d4. otherwise execute division procedure on brush Bezier curve in question and take any part as secondary brush Bezier curve for processing in said brush procedure;
e. in said intersection procedure determine a number of intersections of a particular semi-infinite line starting in said actual point with an actual brush Bezier curve and accumulating said number, until all brush Bezier curves have been processed in the brush procedure and then in case of an odd accumulation result going to said assignment operation but otherwise return to said determination procedure while resetting the accumulation;
f. in said assignment procedure assigning an -inside-indication to the pixel in question, and exit;
g. but otherwise assigning an -outside- indication to the pixel in question, and exit.

The invention also relates to an apparatus for generating a display picture representing a set of object elements including a brush object element. The processing can well be effected in a (large-scale) integrated circuit processor. Various advantageous aspects are recited in the dependent claims.

SELECTED ADVANTAGES TO THE INVENTION

The invention allows a particularly fast and versatile implementation of point-driven coloring of brushes in a display field, wherein the brushes may have many different shapes and find wide applicability, such as in a dezooming situation. Moreover, Bezier curves, paths and shapes of various complexity may be used. Such advantages could be of use in the display of block diagrams, schematics of many sorts, technical drawings, animated movies, text processors, and many others. In particular, the processing operations are of simple form so that they could be done either on general circuitry that is inexpensive, or on special circuits that are optimized for speed. Notably, the data structure may be of any level of complexity and there is little requirement for operator skill.

BRIEF DESCRIPTION OF THE FIGURES

The invention will be explained hereinafter with respect to the following FIGS. wherein
FIGS. 1a–1d give various forms of trajectories and brushes.

PHILOSOPHY OF THE INVENTION

The referenced patent gives ample detail on non-rational Bezier curves of first degree (straight lines) and aribitrary higher degree. Each Bezier curve is completely defined by a limited number of so-called control points, of which the first and last ones coincide with the terminating points of the curve. An analytic expression of the curve is formed by a Bezier polynomial. A Bezier curve of degree $j$ has $j+1$ control points. In first instance, only non-rational Bezier curves are considered.

FIG. 1 gives various shapes of trajectories and brushes that each are formed from Bezier curves of first degree, that is straight line segments. For brevity, higher degree Bezier curves are not discussed. FIG. 1a gives a trajectory consisting of three contiguous straight lines; this trajectory is not a closed figure and by itself would not define an inside region or shape. FIG. 1b gives a trajectory in the form of a seriphed capital L; this trajectory is a closed figure and defines an inside region or shape versus an outside region. In case the inside information is to be displayed differently from the outside region, the relevant assignment is on a pixel by pixel basis. This is no problem when the width of the bars in device coordinates is, for example three pixels or more. In case the width is less, certain noise could occur that would give rise to irregular edges which would decrease legibility. A standard solution is to give normalized shapes for each respective letter size and orientation in the form of bit maps. However, this does not allow for various elementary graphic operations such as rotating, mirroring and non-integer magnification. The problems get even more serious if the widths of the strokes go down to one pixel or less. In certain situations, the strokes may get interrupted due to undersampling. The present solution is to dilate the inside region by means of a so-called brush. FIG. 1c shows an elementary brush object element that is shaped as a square. It has a guiding centre shown as a dot. The guiding centre is now moved along the trajectory. If the brush is sufficiently large, the above problems of edge noise and undersampling will be mitigated: the shape is dilated by the brush area. Dezooming is now effected in that the trajectory gets a variable magnification factor, for example by variation of the point sampling rate in the description of the trajectory. On the other hand, the brush in application coordinates is chosen so that when mapped on device coordinates its dimension would correspond to 1×1 pixel. However, various other dimensions would do as well; it is not necessary that the dimensions should correspond to an integer number.

After coloring, post-processing by a filter may still further improve character shapes. Preferably, the brush dimensions in device coordinates are kept fixed under any zooming/dezooming operation.

Figure 1A:
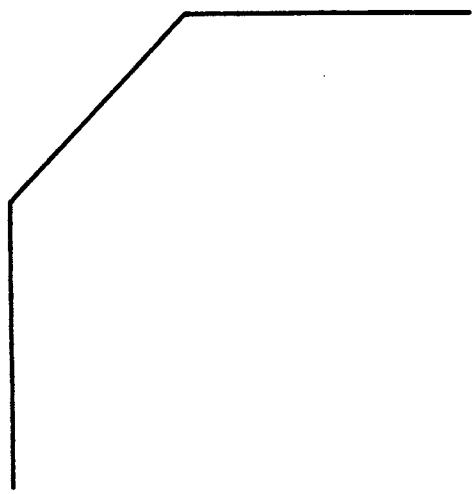
Figure 1B:
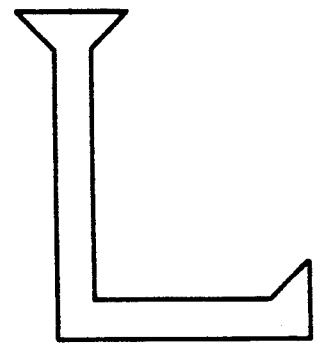
Figure 1C:

A similar effect is reached when the zero-width trajectory of FIG. 1a is dilated by the brush area. This may be done, for example in displaying a block diagram, wherein connectedness in connecting lines between the various blocks must be retained under any degree of dezooming. In this case the connecting lines will never be interrupted. Of course, in other cases the brush would not be used, while also selected brush use may be effected, wherein certain trajectories get the brush treatment, whereas others do not get such.

Figure 1D:
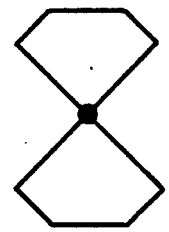

The first degree Bezier curves are straight line segments that are described by two control points located in the ends of the segments: contiguous segments have one control point in common. The phenomena with higher order non-rational Bezier curves are corresponding: the only difference is the necessity for additional control points. Trajectories and brushes may be of various complicated shapes. The guiding centre of the brush need not be its centre of gravity; in fact, it may even lie outside the brush shape proper. Brushes need not be symmetric. For reason of example, FIG. 1d gives a brush in the form of a figure eight. The brush shape always must be a closed path. The guiding centre usually is part of the inside region of the brush. The use of the brush feature may be different in that not the noise or undersampling would be the problems, but in that the object were embellishment of certain shapes. In that case often various asymmetric brush shapes could find application.

Now, the referenced patent uses the even/odd filling convention. If, starting from a particular point, a semi-infinite line intersects the closed path an odd number of times, the point is inside the closed path. Otherwise it is outside. Another convention is the non-zero winding number filling convention: if the vector from the point in question to a point that runs along a full cycle of the closed path winds over a non-zero multiple of 360°, the point in question is inside the closed path. In case of zero winding number the point in question is outside. For certain shapes, the two conventions may give different results. They may also be used in mixed fashion.

APPLICATION OF THE INVENTION

Figure 2A:
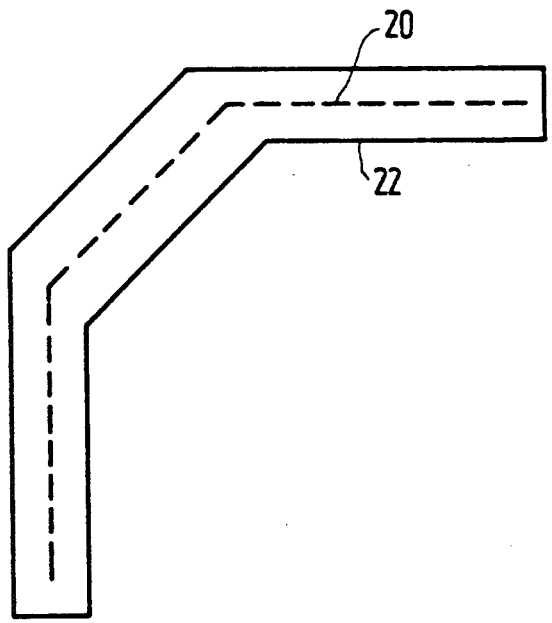
FIGS. 2a–2c give applications of the invention.
Figure 2B:
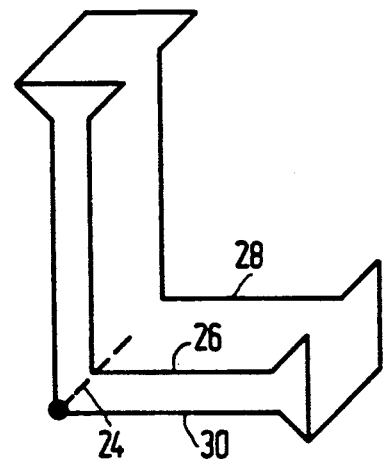
Figure 2C:
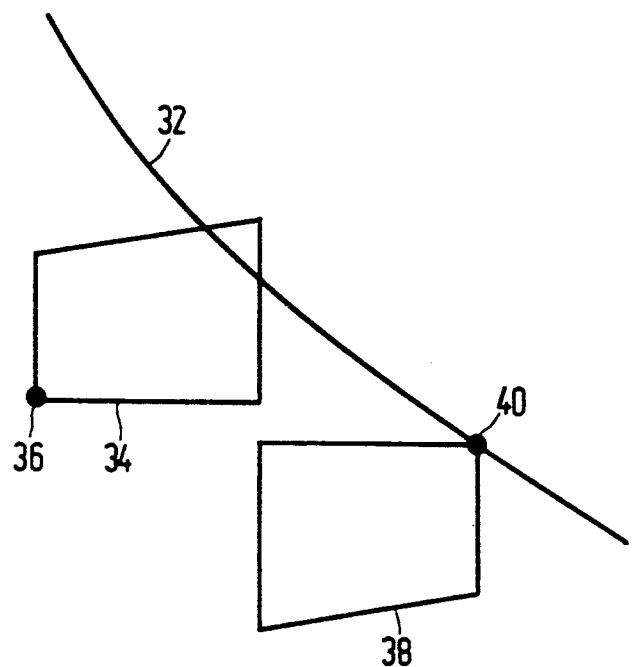

FIGS. 2a–2c give various applications of the invention. FIG. 2a gives the result of the first application of the invention i.e., the combination of the trajectory according to FIG. 1a and the brush shape of FIG. 1c. Herein, the trajectory 20 is shown as a dashed line, whereas the perimeter 22 is given as uninterrupted line.

FIG. 2b gives another result of the first use of the invention. Here, a relatively short trajectory is used as indicated by dashed line 24. The brush now has the shape of the letter L in FIG. 1b. The guiding centre has been indicated in the lower left hand corner by a dot. In an initial position the brush shape is shown by perimeter lines 26, 30. The total area covered by the moving brush is indicated by perimeter lines 28, 30. In this way a shadow-like effect can be given to a character or other shape. Countermeasures against undersampling and the like give similar shapes as shown in FIGS. 2a, 2b.

FIG. 2c gives an example of a test for coherence within window 34, which has the form of a closed Bezier path, with reference point 36. The only relevant edge between two different colors is Bezier curve 32. In practice, such edges would be closed paths; otherwise the colored region would be of indeterminate magnitude. The operation goes as follows: let the reference point 40 of a brush 38 that is congruent with window 34, but inverted in both coordinate directions run along the curve 32. Test whether point 36 is ever covered by the brush shape 38. If it is, no coherence exists, and all pixels of window 34 must be colored accordingly after a separate determination of their positions with respect to curve 32. If point 36 is never covered by the inverted brush, coherence exists, and color determination for a single pixel will yield the color for all other pixels within window 34. The above applies for all positions of reference point 36 with respect to window 34.

DESCRIPTION OF THE PROCESS ACCORDING TO THE INVENTION

The steps to be taken for coloring a pixel in general have largely been described in the referenced patent and are only briefly summarized hereinafter. The object elements are given in a data structure of one or more hierarchical levels that at a lowest level of any hierarchical branch only has Bezier object elements. Now, first the pixel position is translated to a discrete point in application coordinates. Next, the relevance or irrelevance of the data structure for this point is determined. If irrelevant, the process stops. If relevant, the next lower level object elements of the data structure are accessed, each as topmost level of a partial data structure. This determination of relevance goes down until either irrelevance is found, or until at a lowest level a Bezier object element is encountered. Next the colors must be determined on the basis of an inside/outside information. To this effect, first for any Bezier curve the procedure takes a bounding box which encloses all actual points of the curve in question. Often this bounding box is determined by the two end points of the curve. Otherwise, the bounding box may be the smallest coordinate-wise oriented box containing all control points of the curve. Any larger bounding box would also do. If the point in question is outside the bounding box, the color determination may begin. If the point in question is inside the bounding box, the Bezier curve is divided into two parts, each of which has a new bounding box assigned. Usually, this iteration has only a few steps. If the bounding box becomes at most equal to a box of 2×2 points, the process also stops. The operation is repeated for all curves of a Bezier shape. After this process, a semi-infinite, e.g. horizontal, line is drawn through the point in question and the number of intersections through the Bezier shape is counted. The processing of the 2×2 bounding box and the counting of the number of intersections has been considered extensively in the referenced patent. So, if the number is even the point in question is -outside-, if the number is odd, the point in question is -inside-. The so-called non-zero winding number filling convention however can be supported equally simply by counting edge crossings in a signed way dependent on the direction (alongside the closed path) wherein they cross the horizontal line and checking the zeroness of the resulting count at completion time.

Figure 3A:
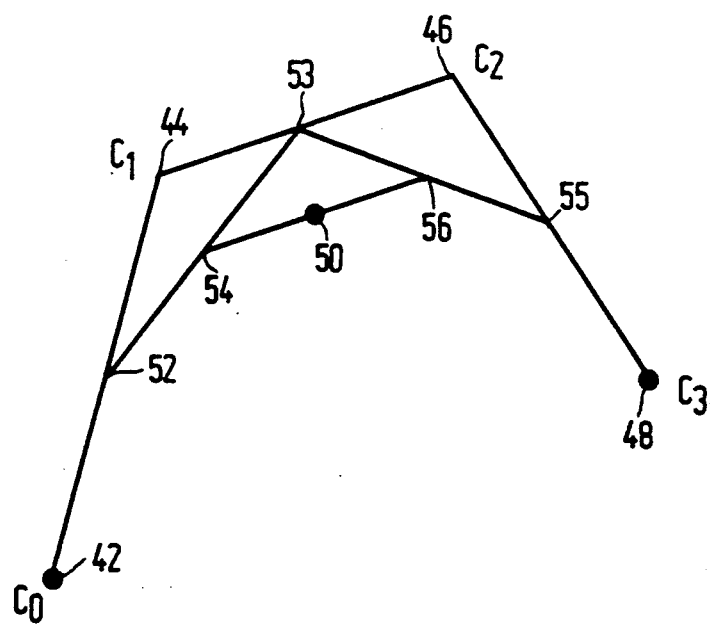
FIGS. 3a–3f illustrates various operations with respect to Bezier curves.
Figure 3B:
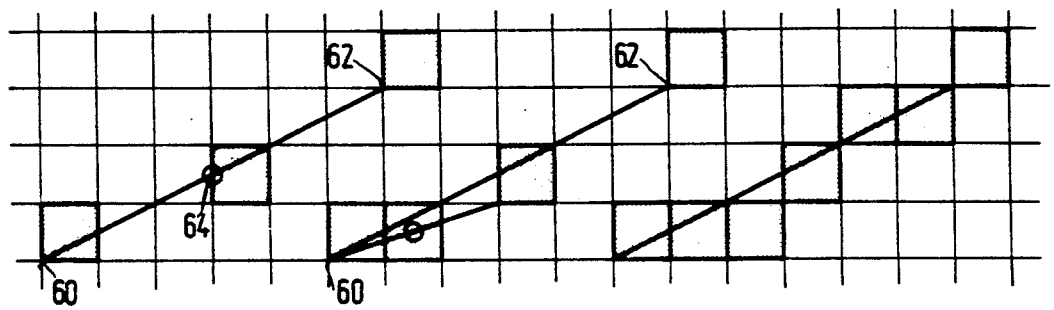

FIGS. 3a–3d give various operations with respect to determination of Bezier curve pixels. FIG. 3a gives the well-known subdivision theorem for a continuous Bezier curve of third degree. The Bezier polynomial is:

$$P(u) = \sum_{i=0}^{n} \binom{n}{i} u^i (1-u)^{n-i} \cdot P_i,$$

wherein n is the degree of the curve, and $P_i$ are the describing vectors of the respective control points. Thus:

$$P(u) = P_0(1-u)^3 + 3P_1 u(1-u)^2 + 3P_2 u^2(1-u) + P_3 u^3,$$

wherein u is the parameter. Points 42–48 are the control points of the complete curve. Points 52, 53, 55 are the mid-points of the segments interconnecting the original control points. Points 54, 56 are the mid-points of the line segments interconnecting the points 52, 53, 55. Point 50 is the mid-point of the segment interconnecting points 54, 56. Point 50 constitutes a control point and end point of two partial Bezier curves that together constitute the original Bezier curve. The other control points of these two parts are 42 (end point), 52, 54, and 56, 58, 48 (end point), respectively. By successive division steps the whole Bezier curve can be found, see also the referenced patent, FIGS. 1b–1e. For determining the position of a point corresponding to a Bezier curve defined on the discrete grid of the application coordinates, reference is had to present FIGS. 3b–3d. For a first degree curve this is shown in FIG. 3b. The control points are 60, 62, both with their associated pixels (grey squares). If the curve is halved (center of circle 64), the associated grid point on the discrete grid is again shown as a grey square. Here, "associated" means that the grid point represents the area if the mid-point is either within or on the left edge or lower edge of the area. Thus, through truncating, the quasi mid-point is the lower left hand edge of the square in question. In the Figure a new circle gives the midpoint of the half-curve at left, and the associated discrete point in grey. As a final step, the determination of the midpoints and associated application space grid points is carried through to the end. If the control points lie within a 2×2 point square, the division process is terminated.

Figure 3C:
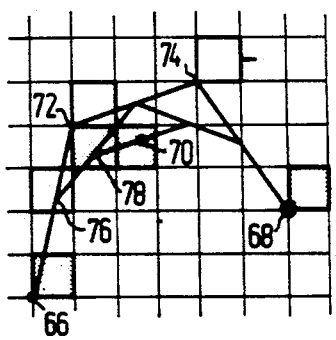

FIG. 3c shows the same kind of procedure for a non-monotonic Bezier curve of third degree. Now, the curve may extend outside a rectangular box that contains the first and last control points. It may be proven that the curve may not extend outside a rectilinear box that contains all control points. The left hand version gives control points 66, 72, 74, 68 and associated pixel areas. Furthermore, successive divisions give control points 66, 76, 78, 70 of the left hand half-curve which are indicated grey. By truncation the new control points come in the lower left hand corners of these point areas.

Figure 3D:
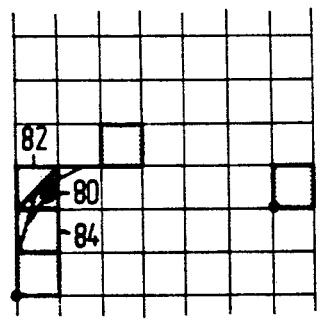
Figure 3E:
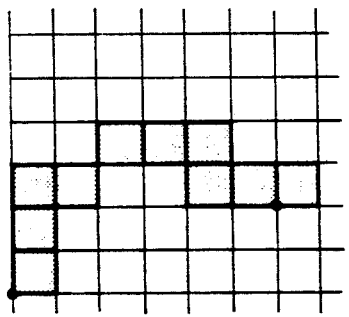

The next version of FIG. 3d gives the calculation of second stage midpoint 80 that is translated to grey point 82. The additional new control points both are in grey point 84, so their truncated control points coincide. The last FIG. 3e shows in grey all points on the discrete application coordinate grid generated for the Bezier curve in question.

Figure 3F:
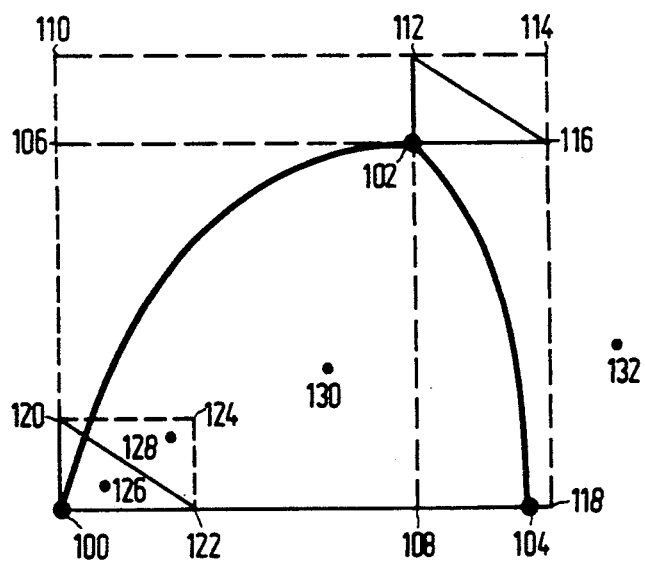

FIG. 3f illustrates the guiding of a brush shape along a trajectory. The trajectory contains three curves 100–102; 102–104; 104–100, that for reasons of simplicity has been chosen as monotonic. The control points other than end points have not been shown. The brush has the shape of an unsymmetric triangle with an angle of 90°. The brush has been shown in two positions: 100–120–122 and 102–112–116, with its guiding centre coinciding with the end points of Bezier curve 100–102.

For the present, only this curve is considered. Because of monotonicity, the bounding box as shown, given by end points 100–102 contains all control points of curve 100–102. If necessary, a larger bounding box may be used as mentioned earlier. This bounding box is dilated with the bounding box of the brush shape, to yield a composite bounding box given as 100–110–114–118. The edge lengths of the dilated box are given by the sums of the edge lengths of the trajectory bounding box and of the brush bounding box. The summing is done as shown: the moving brush bounding box will remain within the dilated bounding box. The following cases now exist for the position of the point in question, wherein the situation for -brush only to be colored- and -brush plus trajectory shape to be colored- are treated side by side:

A. point in question not in dilated bounding box: 132. This means that the color of the pixel corresponding to this point can now be determined inasfar as only the motion of the brush along curve 100–102 is concerned. If only the brush is considered for a different color, this pixel gets the -outside- color. If the closed path 100–10-2–104 as dilated by the brush is to get the -inside- indication; the number of intersections of a semi-infinite line through point 132 with the closed path must be calculated. The contribution for curve 100–102 is obviously zero or one. Next, a similar calculation as for curve 100–102 must be made for the other curves, inclusive of all operations that are discussed hereinafter with respect to curve 100–102. At the end, contributions by the other curves to the number of intersections would give a final result. If for all curves that constitute the closed path the point is outside the dilated bounding box, the number of intersections for this curve in the "even/odd filling convention" would either be zero or two, and the point in question would get an -outside- indication. If, in this case, the trajectory itself does not govern a color, only the brush is considered for the -inside- information determination. In the case of FIG. 2a the -inside- information then controls a color. In the case of FIG. 2c the -inside-information then indicates a non-coherent result which necessitates color determination for all pixels separately (or alternatively), to divide the regions of the respective pixels and redo the processing for the subregions.

B. point in question is inside the dilated bounding box but not in brush bounding box when brush positioned with guiding centre in either end point (130). Color undecided and go to next dividing step. In this step the Bezier curve is divided as explained earlier and the process is repeated wherein each half of the curve is considered to be a separate curve. Again the bounding boxes of the parts are dilated with the brush bounding box.

C. point in question inside brush bounding box when brush reference point coincides with either end point as, e.g. in points 126, 128. Now, if only the brush is to be colored, the problem restricts to deciding whether the point in question is within the brush shape itself. This determination is done in the same way as in the referenced patent; the relevant curves now are the edges of the brush shape. If the point is inside the brush shape (e.g. 126) the associated pixel gets the brush color. If it is outside the brush shape (128), it is treated in the same way as point 130: the Bezier curve 100–102 is divided according to the algorithm described and the points are treated again for the smaller, dilated composite bounding box, and for the brush bounding box, respectively. This applies to both parts of the curve. The processing as point 132 is done if outside both composite bounding boxes. The processing as point 130 is done if within at least one composite bounding box. The processing as point 126, 128 is done if within at least one brush bounding box. With respect to curve 100-102 there are no other cases than the possibilities 126, 128, 130, 132 treated herebefore.

For each part of curve 100-102 the division processing is continued until either:
the point is outside the dilated bounding box;
the point is inside the brush when positioned on one of the end points;
in that case, the point's pixel gets the -inside- color;
all control points of the curve part are inside a 2×2 point square; in that case the processing again is elemental as described in the reference patent; in many cases this last possibility will not justify separate treatment because of the size of the brush being big enough for the case of point 130 not to occur.

It has been found that usually, the number of process steps to reach any of these decisions is quite small. Further, the process is effected in exactly the same way when a curve has control points not in the bounding box given by the end points. The only difference is that the bounding box is enlarged to encompass all control points. This applies both for the trajectory and for the brush.

The above-described process can often be simplified. If the brush is a rectangle, the case of point 128 does not exist. The occurrence of the point 126 case then directly leads to the -inside- coloring and the process can be terminated.

DESCRIPTION OF A HARDWARE IMPLEMENTATION

Figure 4A:
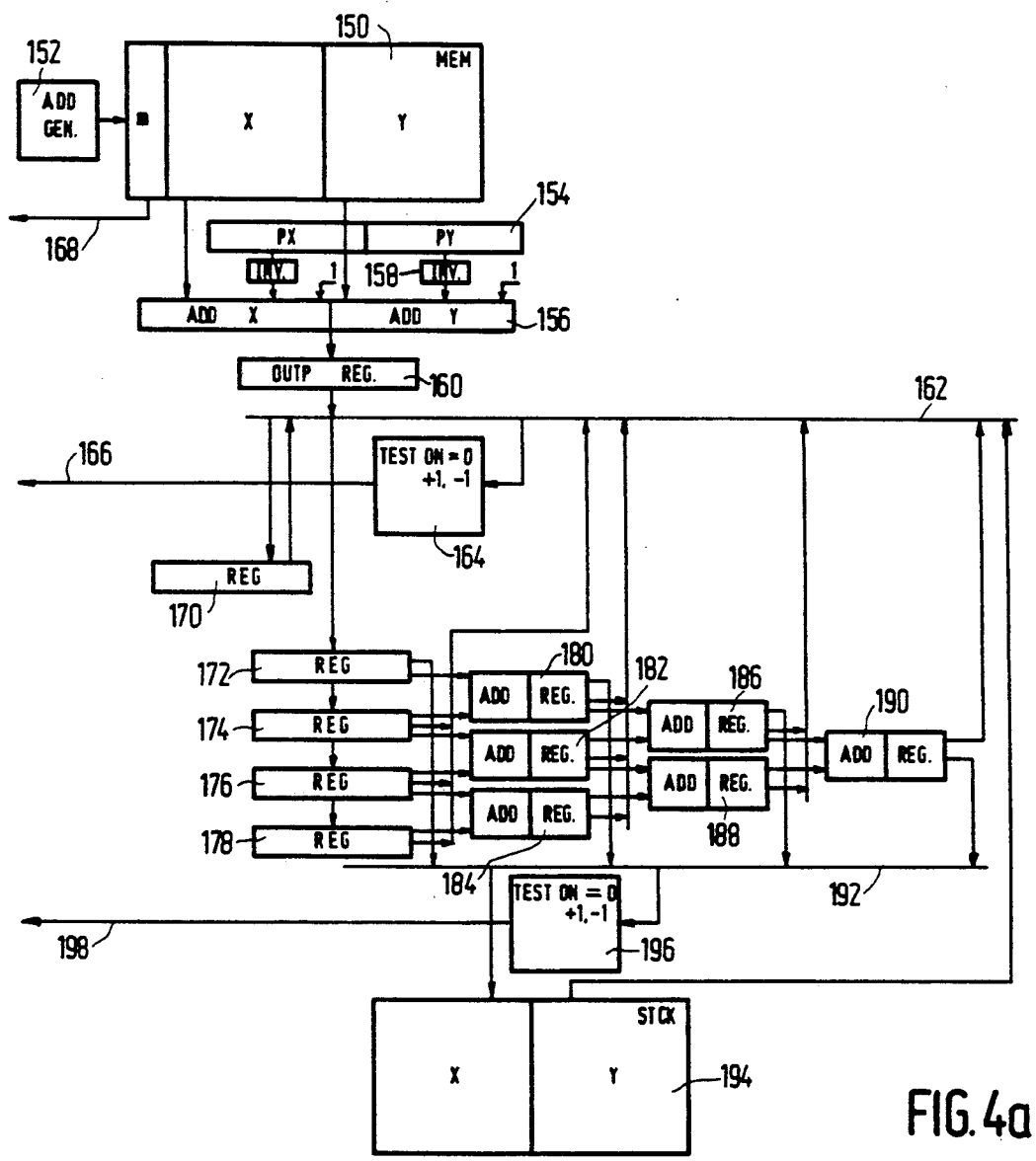
FIGS. 4a–4c give architectures for executing the operations according to the invention.

FIG. 4a shows an elementary processor architecture for calculating the inside-outside indication. For simplicity a unitary limiting shape is considered, this means that either the trajectory shape with zero brush dimension is considered, or the set-up is used for the brush shape only. The case of a composite limiting figure, wherein both trajectory and finite brush dimension must be considered, is described with respect to FIG. 4c. Now, the coordinates of the control points of the Bezier curves of the trajectory are stored in memory 150, having an address generator 152. For each entry the x and y values are stored and also an indication m that gives the degree of the curve. x and y are defined in application coordinates. For brevity, the loading mechanism and the reset for address generator 152 have not been shown. Element 156 is an adder that for explicitness has been shown separately for x and y values, respectively. In practice, a single adder may be used in multiplex operation. For the remainder of the set-up, this doubling is not shown. Adder 156 receives the contents of store 150 and furthermore, the contents of register 154 that contain the coordinates of the point corresponding to the pixel that must be colored, after inversion by elements 158. Furthermore, a single 1 is fed to the lowest significant bit position but one. In this way, the two's complement representation of the actual point's coordinates is produced and a correct subtraction is effected. Multiplexed output register 160 receives the relative coordinate values of the control points of the Bezier curve. Line 162 indicates a conceptual bus interconnection. For brevity, the actual hardware realization is ignored. Element 164 is an on-the-fly discriminator for executing various tests on the set of control points of any actual Bezier curve or part thereof. If all control points of a Bezier curve have the same signs for either relative x coordinate values or for relative y coordinate values, the actual point is outside the bounding box and only the contribution of this edge to the number of crossings must be calculated. If all control points are in a 2×2 square, further division will not yield new information and the halving process may be discontinued. If the actual point coincides with either one of the end points, no further halving is necessary. An associated signalization of the above to a sequencer device not shown appears on output 166. Thereupon a next Bezier curve from memory 150 is accessed. In such accessing, the signalization of m on line 168 to the sequencer controls the number of control points that must be read from memory 150. For the set-up shown, this number is limited to 4 maximum. In reading out a new set of control points, the last thereof is intermediately stored in register 170, to be retained as the first control point of the next curve of the trajectory: contiguous sides have their end points in common and double storage in memory 150 is not effected. The control points are now loaded in succession in registers 172, 174, 176, 178. Because the test in element 164 had given a negative outcome, the dividing process is effected by an array of adders each provided with an output register 180-190. In adding the full number of bits is retained so that effectively, the number of significant bits increases by one each time. Thereafter, the control points of the second part of the Bezier curve are stored in registers 172, 180, 186, 190 as far as required: the first two are always filled, the latter two only if the original number of control points suffice. For a Bezier curve of order 1 the control points of the first part are now stored in registers 174, 180. For a Bezier curve of order 2 the control points of the first half are now stored in registers 176, 182, 186. For a Bezier curve of order 3 the control points of the first part are now stored in registers 178, 184, 188, 190. The control points of the first part are now read out from their associated registers under hardwired shifting to their standard number of significant bits and via bus 162 and are cycled in the same way as was done for the original Bezier curve, including the test done by element 164. Furthermore, the control points of the second part are now read from the relevant registers via a similar hardwired shift to a second bus system 192 for storage in stack memory 194, that has a last-in-first-out organization. Element 196 on-the-fly executes similar tests as does element 164. If the test results indicate that the Bezier curve part needs no more processing in the array, storage in stack 194 is omitted, and a relevant signalization is carried on line 198 towards the sequencer. If element 164 signals that no further processing needs be done on the control point set received, first stack 194 is accessed, and the process repeats. Finally, after all parts of the Bezier curve in question have been treated, a new set of control points is read out from store 150 (inclusive of the first control point from register 170). In principle, element 196 may be omitted, in that its tests are duplicated by element 164. The set-up shown diminishes the storage capacity needed in stack 194.

Figure 4B:
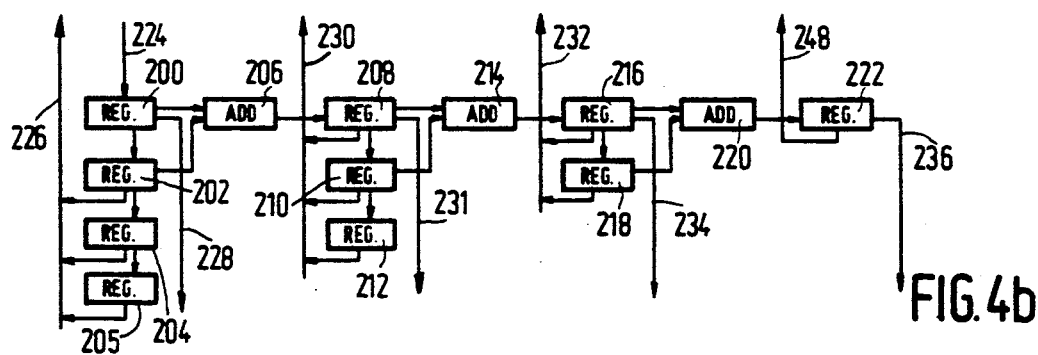

FIG. 4b gives a modification in FIG. 4a that allows for less hardware without significant slowing down of the operation. The number of registers is the same as in FIG. 4a. In the first column, register 200 receives the first control point C1 (via bus 162, from register 170 or store 150). Next, the contents shift to register 202 and the second control point is received C2. Next, adder 206 calculates the sum thereof: C1+C2, which is stored in register 208. Next, all the contents shift and the third control point is received: C3. The registers now contain, C3, C2, C1, -; C1+C2, -, -; -, -; -. Next, the fourth control point is received and adder 206 executes an operation to give the following stored results: C4, C3, C2, C1; C3+C2, C2+C1, -; -, -; -. Next, all contents shift downwards and adders 206, 214 execute an operation to give the following results: -, C4, C3, C2; C4+C3, C3+C2, C2+C1; C3+2C2+C1, -; -. After the following shift and on adding operation by adders 214, 220 the following stored results are acquired: -, -, C4, C3; -, C4+C3, C3+C2; C4+2C3+C2, C3+2C2+C1; -. After a final shift and an adding operation by adder 220 the following stored results are acquired: -, -, -, C4; -, -, C4+C3; -, C4+2C3+C2; C4+3C3+3C2+C1. The quantities C4, C4+C3, C4+2C3+C2 and C4+3C3+3C2+C1 are outputted on lines 228, 231, 234, 236 to bus organization 192. The quantities C1, C2+C1, C3+2C2+C1, C4+3C3+3C2+C1 are outputted on lines 226, 230, 232, 248 to bus organization 162. For brevity of description, the relative timing among the various additions is not shown. In fact, the information of any new control point may be outputted directly when available.

IMPLEMENTATION OF FINITE BRUSH

Figure 4C:
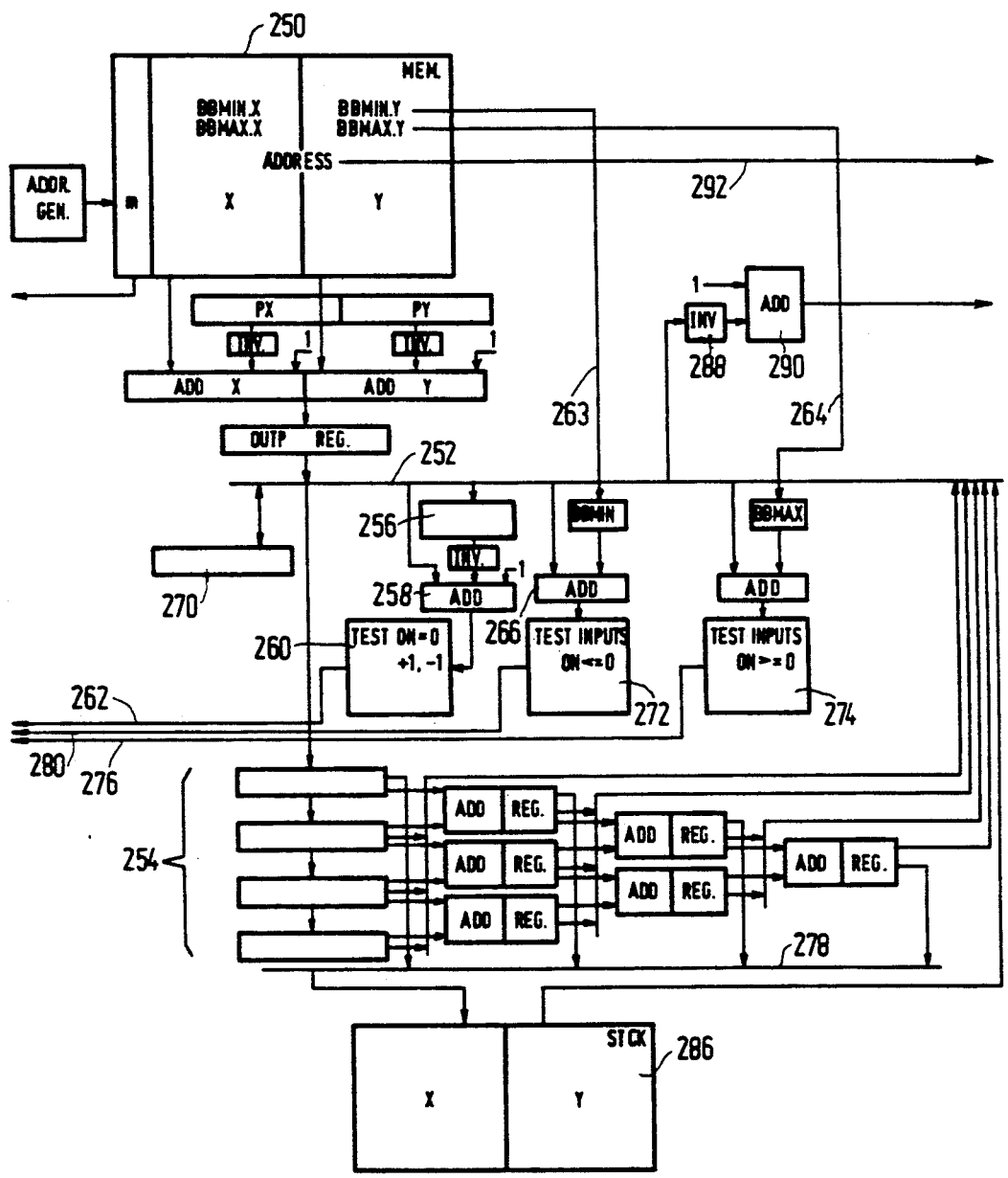

FIG. 4c gives a hardware set-up for implementing dilation by a non-zero brush. To a large part, the set-up corresponds to FIG. 4a and this part is not considered in detail. The store 250 now contains the control points of the trajectory, and also the dimensions of the bounding box containing all control points of the brush shape, or, for that matter, any reasonable box containing all actual points of the brush shape. The hardware between memory 250 and bus structure 252 corresponds 1 to 1 to FIG. 4a; inclusive of register 270. The array 254 corresponds to FIG. 4a. For brevity, the modification according to FIG. 4b is ignored. Register 256 receives relative application coordinates with respect of the point for which the color is to be determined, of the first control point of the next Bezier curve. Adder 258 thereupon receives any further control point of that curve, after which the two are subtracted (258); note the −1 inserted for correct two's complement subtraction. Box 260 executes a test that would indicate that all control points would lie in a 2×2 point square. If so, division of the Bezier curve (part) in question is not useful, and the array 254 need not come into action which is signalled on line 262 to the sequencer not shown. Line 263 gets the x,y coordinates of the lower left hand corner of the brush bounding box (with respect to its guiding centre). Adder 266 adds this to the associated (relative) x,y coordinates of any control point of the trajectory curve (part) and element 272 tests whether for at least one of the control points the result for the x-coordinate is negative and for at least one control point the result for the y-coordinate is negative. These two control points may be a single or two different control points. A similar set-up is present for the maximum x,y values of the brush bounding box (i.e. the upper right hand corner). Here the test is, whether for at least one control point the result for the x-coordinate is positive and for at least one control point (the same one or another) the result for the y-coordinate is positive. If both tests of blocks 262, 274 are positive, the point in question is inside the dilated bounding box. From the signalization on lines 262, 276, 280 the sequencer, not shown, will derive, whether a new Bezier curve may be accessed, from store 250 or from stack 286, or whether the array 254 must carry out a subdivision operation. A bus structure 278 is present on the other side of array 254. Also, a similar stack 286 is present as in FIG. 4a. If the actual point considered is within the brush bounding box, when the brush reference point is positioned on the first or the last control point of the Bezier curve part in question, the actual brush must be accessed. This is done in the set-up of FIG. 4a. To this effect, the end point coordinates of the relevant Bezier curve are outputted via inverter 288 with addition of 1 in adder 290: note that these are relative control point coordinates that now appear as defined in the coordinate system of the positioned brush. These point coordinates are now stored in register 154 of FIG. 4a. Further, a reset is given on line 292 to address generator 152. After determination whether the point was inside or outside the brush, a signal from the set-up of FIG. 4a is sent to the sequencer. No further interaction between the respective hardware of FIGS. 4a, 4c is necessary. Of course, for a comprehensive device, various subsystems may be shared among these two Figures.

The above disclosure related to the case where the trajectory did not define an inner shape. If it does, the only additional test required is for determining the number of intersections of the closed trajectory curve and a semi-infinite line through the point in question. In itself this test has been described in the referenced patent. The associated division operations the Bezier curve parts in question may be executed by a logic corresponding to FIG. 4c, but with a test mechanism added that is equal to box 164 in FIG. 4a. If the point in question is either inside the trajectory shape or anywhere inside the brush when moved, the associated pixel gets the -inside-coloring. The decision or whether first the trajectory test or first the brush test or both operations in parallel, may be optimized for maximum speed. Among other things, this may be determined by the character of the data structure, the dimensions and shape of brush and trajectory.

USE OF RATIONAL BEZIER CURVES (RB)

Any arbitrary curve can be approximated to an arbitrary accuracy by a piecewise non-rational Bezier curve. However, in certain circumstances, rational Bezier curves would be used for the brush, in particular, because circles and ellipses cannot be directly written as a non-rational Bezier curve.

The continuous plane formula for rational Bezier curves is given by:

$$RB(t) = \frac{\sum_{i=0}^{i=m} w_i C_i \binom{m}{i} t^i (1-t)^{m-i}}{\sum_{i=0}^{i=m} w_i \binom{m}{i} t^i (1-t)^{m-i}}$$

where each control point $C_i$ in the plane is weighted by the usual polynomials and an additional weight factor $w_i$. The most obvious difference is of course the denominator which is a scalar function of t that is applied to all control points (and to their x- and y-coordinates) equally. A discrete counterpart for this formula (involving only simple and stable operations in our discrete world space) is most probably non-existent. As the only assumption made about our regions is that they should have a finite extent, it will be assumed from now on that all weighted control points $w_iC_i$ are bounded and that the denominator function is nowhere equal to zero along the curve segment.

A better formula results from "multiplying out" the denominator to become the third coordinate of the curve points in a now three-dimensional space. In this space the formula is obtained for an ordinary non-rational Bezier curve that is defined by the control points with 3D-coordinates $(w_iC_{ix}, w_iC_{iy}, w_i)$. The rational curve can be seen as the perspective projection of the non-rational curve onto the $w=1$ plane, or said otherwise: the non-rational curve lies on the infinite cone segment with the origin of the 3D-space as its apex and supported by the rational curve.

Figure 5A:
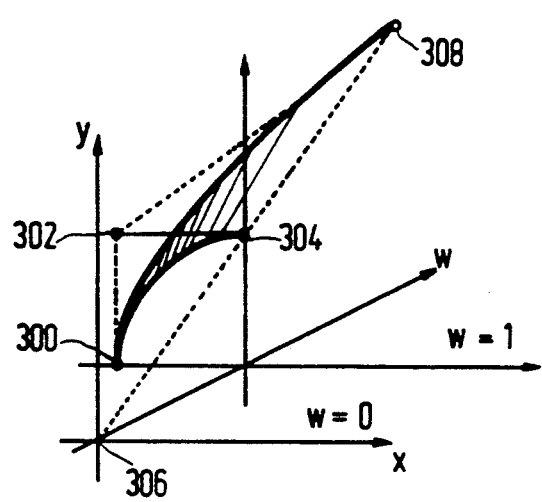
FIGS. 5a–5c illustrate operations with respect to rational Bezier curves.

In this respect FIG. 5a shows a 2-dimensional rational Bezier curve in the plane $w=1$. For simplicity, only three control points 300, 302, 304 are assumed. The origin is at 306. The 3-dimensional non-rational counterpart lies on the same cone segment and has end points 300, 308. As will be shown hereinafter, the two curves need not have any point in common. One consequence of such a generalization of the curve definition is that the w-coordinate has to be divided out again to obtain the coordinates of the curve segment division points in the 2D plane, and to detect if the stopping condition is reached which requires the control points to be one discrete world plane "pixel" apart. Division is however a highly undesirable operation if it needs to be implemented robustly with simple and stable finite precision arithmetic.

The following solution is used. The point containment for these regions in the discrete plane is defined not via the definition of discrete rational outline curves, but deduced as the counterpart of a higher level topological property in the continuous space. Imagine a closed piecewise rational Bezier outline in the $w=1$ plane which is our 2D modelling plane. The non-rational versions of the segments all lie on the cone supported by the outline.

Figure 5B:
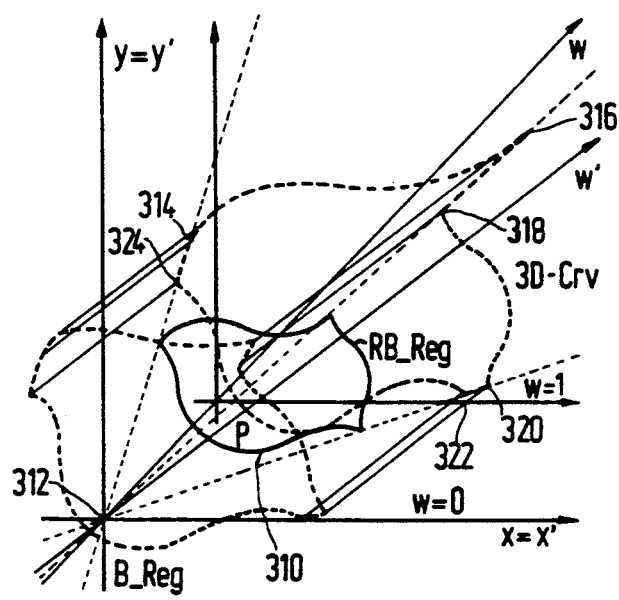

FIG. 5b shows a closed rational Bezier path 310 that consists of three rational curves (in practice non-rational and rational curves may occur in mixed fashion). The origin 312 has radii in dashed representation. The corresponding 3-dimensional non-rational curves have been shown as dashed curves 314/316, 318/320; and 322/324, respectively. The respective curves may not be connected directly because of different values of w in the respective end points. However, the joining may be effected by dashed segments 316/318, 320/322, 324/314 that are radii of the same cone. If the point is contained by the 2D region, the ray through this point and the origin will be inside the cone volume too. The topological property is that this ray will then also be inside a cylinder volume that is parallel to this ray and has that piecewise non-rational 3D curve as its supporting curve (and vice versa). The same applies to the intersections of both cylinder and ray with the $w=0$ plane: to check point containment by the RB-Region (rational Bezier) it suffices to test if the origin is contained by the outline that results from the parallel projection of the non-rational 3D curves onto the $w=0$ plane through the origin. Note that this projection is parallel with that ray, so usually not orthogonal to the plane. Since Bezier curves are invariant under parallel projections, this projected region is nothing other than a normal B-Region (Bezier) for which the point containment problem was solved earlier. The projected non-rational curve segments are defined by their projected control points of which the x- and y-coordinates can be seen to be equal to those of the non-orthogonal axis system defined by the original x and y axes and a w'-axis coincident with the ray through the 3D origin and the point in question, P, in the $w=1$ plane. The relevant part of the coordinate transformation matrix is:

$$\begin{pmatrix} C_{ix} \\ C_{iy} \end{pmatrix} = (w_iC_{ix}\ w_iC_{iy}\ w_i) \begin{pmatrix} 1 & 0 \\ 0 & 1 \\ -P_x & -P_y \end{pmatrix} =$$

$$(w_i(C_{ix} - P_x)\ w_i(C_{iy} - P_y))$$

and thus each rational Bezier control point with a weight factor that is not equal to one, needs a multiplication for its x- and y-coordinates before it enters the algorithm of the previous sections (where the point for which we test point containment is always the origin). Note that if all weights were equal to one (so we had a non-rational B-Region to start off with), this information reduces to the translation of the point in question to the origin. Note also that the straight line segments on the cone that we introduced to construct a closed curve in 3D, can have no influence on the number of intersections with the semi-infinite straight line used to determined the inside-outside indication. In fact, the only way they can have a point in common with the semi-infinite line would be by fully being coincident with that line.

So the point containment for RB-Regions has been defined by transforming the control points to another region in the discrete plane for which we had already specified point containment regarding its outline. The only new operations introduced hereby are fixed point multiplications that need to be done for each truly rational control point, once for each point in question. The best numerical results are obtained if the $w_i$'s of all control points of an RB-Curve are scaled while modeling with a common factor to maximize their number of significant bits.

We can even cut back drastically on the number of multiplications if we have the quite typical case of curves with all positive weights. Then the convex hull property is still valid, so we only need to multiply if the point in question is contained in the box around the convex hull of the control points $C_i$ of one of the outline segments.

Figure 5C:
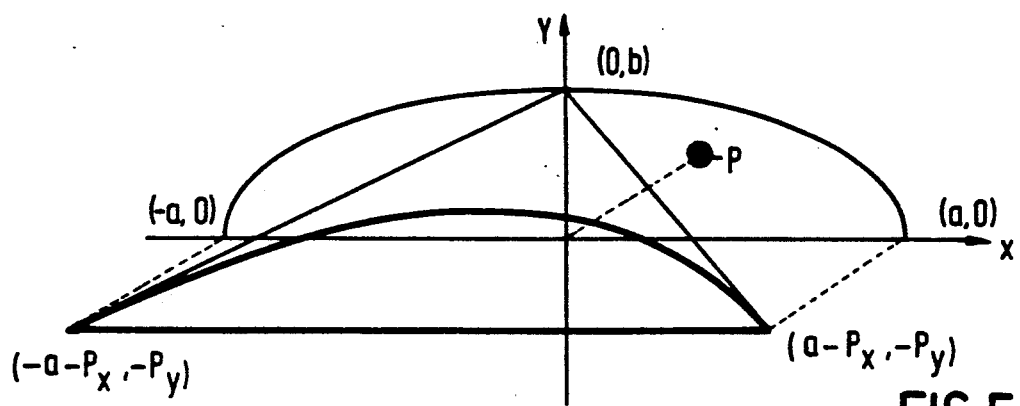

With this general algorithm, we can put constraints on the input regions and obtain simplified versions of the algorithm. This leads to useful results for the case of an elliptical region outlined by two semi-elliptical curve segments ending on the main axis. If the main axes have lengths $2a$ and $2b$, the first and last control point lie at $(-a,0)$ and $(a,0)$, both with weights equal to 1. The middle control point degenerates in the general conic formula to the point at infinity along the 2D y-axis, but with zero weight: the control point of the corresponding 3D parabola lies at $(w_1C_{1x}, w_1C_{1y}, w_1)=(0,b,0)$. Transforming this control point through the above matrix (i.e. parallel projecting it into the $w=0$ plane), gives a constant $(0, b)$, independent of P. Thus checking if $(P_x,P_y)$ is contained in the (upper half of the) ellipse, can be done by first checking if it is within the box diagonalized by (−a,0) and (a,b), and if so, to check if the parabola controlled by (−a−$P_x$,$P_y$), (0,b), and (a−$P_x$,−$P_y$) intersects the negative x-axis once, (see FIG. 5c). For this special case no multiplications are needed: we only have to suppress in the non-rational algorithm the "origin translation" of the second control point. The algorithm will be as precise and numerically stable as it was before, and reveal the point containment result fast for points far from the elliptical outline, and logarithmically slower for points closer to it, with a lower bound on the speed defined by the modeling precision in the discrete world space. Thus, the modification necessary to the hardware in FIGS. 4a, c would be slight.

ACCELERATION OF THE DETERMINATION

Figure 6A:
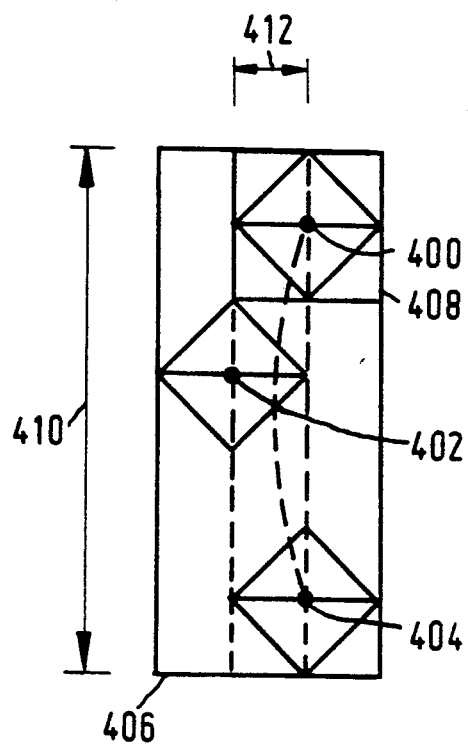
FIGS. 6a–6c illustrate various acceleration mechanisms for the process.

Hereinafter, several acceleration stratagems are given for the calculation explained with respect to FIG. 3f. The first improvement is reached for determining whether a particular category of points is ever covered by the brush, provided that the latter covers all points within the brush bounding box on either a horizontal or on a vertical line through its guiding centre. This indeed is the case in FIG. 3f, and also applies to circles, ellipses and rectangles where the guiding center is the point of gravity of such symmetric brush shape. The calculation is as follows: determine whether a vertical line through the point in question crosses the horizontal diameter of the brush when the brush' guiding center is positioned in all respective control points of the trajectory curve. If the determination is always positive for any control point and if the point in question also lies within the Y-coordinate interval defined by the first and last control points of the curve, the point in question will be covered by the brush and the divisioning operation is not necessary and the color assignation may be effected directly. The termination also may result if a horizontal line through the actual point would cross all vertical diameters whereas also the point in question lies within the X-coordinate interval defined by the first and last control points of the curve. In the situation of FIG. 3f, however, the next division step is necessary. For a vertical or horizontal straight trajectory, however, the division would be superfluous. However, the method gives a correct result for any degree guiding curve. In principle, the method may like wise be effected along an oblique axis, provided that the brush shape conforms. Usually, the coordinate transform required would negate the acceleration reached. FIG. 6a shows an example. The curved trajectory (broken line) has three control points 400, 402, 404. The brush is diamond-shaped as shown. The dilated box 406 is shown with one position of the brush bounding box 408. It can be proven for any kind of Bezier curve that the rectangle determined by the vertical distance between the begin point and the end point thereof (400–404) and the AND-ing of the horizontal diameters of the brush bounding boxes as shown (arrow 412) is always covered by the moving brush. Therefore, color assignment may be done straightaway.

Figure 6B:
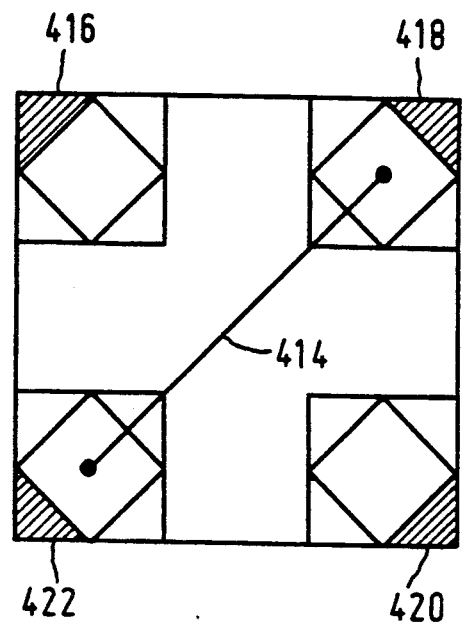

The second improvement also obviates the need for executing the divisioning in cases where the point in question is in one of the extreme corners of the dilated bounding box. FIG. 6b shows a straight trajectory with the same brush shape as in FIG. 6a. The brush boxes are positioned in each of the corners of the bounding box. For each of these positions, the points in the coherent non-brush regions of the bounding box that are contiguous to a corner of the dilated box are excluded from further consideration for the trajectory in question. If the degree of the trajectory is higher, the positions of the brush bounding boxes in the corners need not be coincident with any real position of the brush. The determination of whether the point in question is in any of hatched regions 416–422 is taken in the intersection procedure for the brush. The determination of which corner part be excluded is determined as follows: determine the relative coordinates of all control points with respect to the actual point under consideration. If both all relative x-coordinates have the same sign and all relative y-coordinates have the same sign, the point in question is considered outside the dilated region and therefore in one of the "corner" regions as defined supra. In consequence, the treatment of this trajectory part can be dispensed with.

Figure 6C:
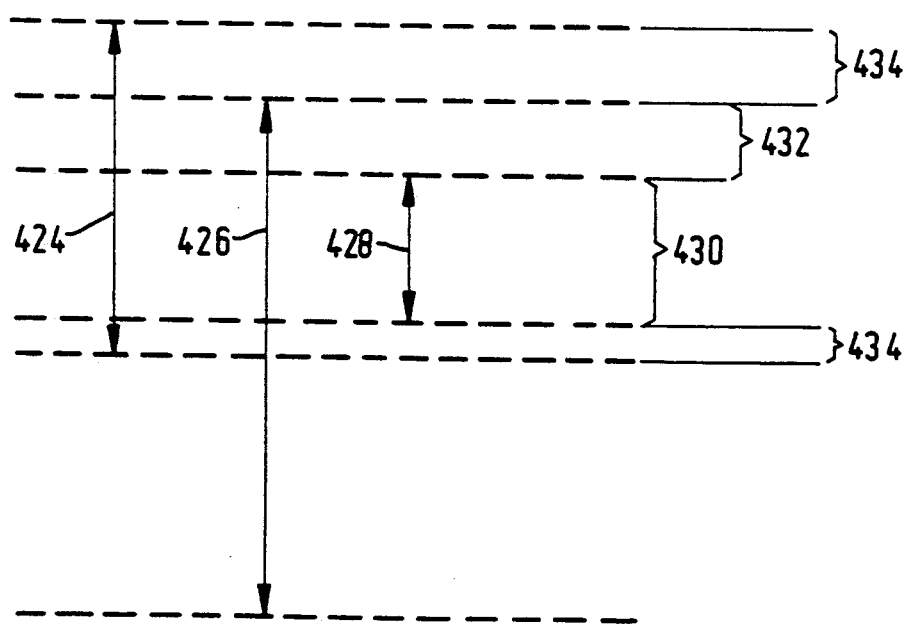

The third improvement limits the number of trajectories to be considered in the intersection procedure. To this effect, all intersecting semi-infinite lines are parallel and, preferably, parallel to one of the coordinate axes, for example, horizontal. Now, for any actual point, only those curves would be relevant, whose dilated (if trajectory) or non dilated (brush procedure) bounding box would be covered by the horizontal infinite line through the actual point. All points on this line would therefore consider the same subset of trajectory curves. Mutual AND-ing of the vertical dimensions of this subset of trajectory curves and with the complementary intervals of the non-relevant edges gives a set of contiguous rows of pixels for which only the same subset of trajectory curves need be accessed. In FIG. 6c the heights of three dilated boxes are shown as 424, 426, 428. For the points on the lines in region 430 all three trajectories must be processed, starting with the "determination procedure". For those in region 432 only trajectories 424, 426 must be considered. For those in regions 434, only trajectory 424 need be considered. For other cases still further subsets would apply, not shown here in more detail.

I claim:
1. A computer method for pixel-wise generating a display picture representing an object set of object elements, the object set including a brush object element and a guiding trajectory, the brush object element being a brush shape having a guiding center and being defined by one or more closed paths, each closed path comprising a concatenation of at least one brush curve each of which is a respective Bezier curve, the guiding trajectory comprising a concatenation of at least one trajectory curve, each trajectory curve being a respective non-rational Bezier curve the guiding center being a point within the brush shape which is moved along the trajectory curve, the method comprising the steps of:
   a) providing a representation of:
      i) a respective trajectory set of control points and an associated trajectory curve bounding box oriented according to coordinates, for each trajectory curve;
      ii) a respective set of brush control points and an associated brush curve bounding box, for each brush curve; and
      iii) a brush bounding box for containing all points of the brush object element;
   b) for each pixel of the display picture, identifying
      i) an associated unique actual point in the space which contains said object element; and
      ii) respective associated coordinate values from said point for any relevant object element;

c) for each trajectory curve, positioning the brush object element at either end point of the trajectory curve and generating a dilated box that encompasses the brush bounding box at said positioning;

d) performing a set of determining steps including:
   i) determining that the actual point is outside a current dilated box, and in this case rejecting a current trajectory curve represented by the current dilated box, choosing a new trajectory curve, and re-executing steps c) and d); or
   ii) determining that the actual point is inside the brush bounding box, when said guiding center of the brush object element is positioned at either end point of the current trajectory curve, and in this case then executing step e) with respect to such end point; or
   iii) otherwise dividing the current trajectory curve into parts, choosing one of the parts as a new current trajectory curve, and re-executing step d), whereby the current trajectory curve is divided when the determinations of steps d)i) and d)ii) are inconclusive;

e) performing a set of brush steps including, for said actual point and for a current brush curve:
   i) determining that said actual point is outside the brush curve bounding box associated with the current brush curve, and in this case executing step f) ;
   ii) determining that the actual point coincides with any end point of the current brush curve, and in this case executing step g);
   iii) determining that all control points of the current brush curve lie in a 2×2 discrete point square, and in this case executing step f); or
   iv) otherwise dividing the current brush curve into parts, taking one of the parts as a new current brush curve, and re-executing step e), whereby the current brush curve is divided when the determinations of steps e)i), e)ii), and e)iii) are inconclusive;

f) performing a set of intersection steps including:
   i) determining a number of intersections of a half line starting at said actual point and having a predetermined standard direction, with the current brush curve;
   ii) adding said number to an accumulating value;
   iii) choosing a new current brush curve in the brush bounding box and re-executing step e) until there are no more new brush curves in the brush bounding box; and
   iv) if said accumulating value is odd when there are no more new brush curves in the brush bounding box, executing step g); otherwise resetting said accumulating value and returning to step d);

(g) first assigning an -inside- indication to the pixel corresponding to said actual point and ending processing for that actual point; and h) alternatively assigning an -outside- indication to the pixel corresponding to said actual point when there are no more new trajectory curves for treatment in step d) and step g) has not been executed.

2. A method as claimed in claim 1, further comprising, in parallel with the first and second sub-steps of the set of determining steps, the step of testing whether all control points of the current trajectory curve lie in a 2×2 discrete point square, and upon a positive result executing the set of brush steps, with the guiding center of the brush object element positioned at either end point of the current trajectory curve.

3. A method as claimed in claim 1, wherein said half line defines a first coordinate direction, the method further comprising, in parallel with the first and second sub-steps of the set of determining steps, the steps of:
   a) first testing whether a straight line through said actual point and perpendicular to said first coordinate direction always crosses the brush object element, when the brush object element is positioned with its guiding center on any arbitrary control point of the current trajectory curve;
   b) second testing whether said actual point lies between first and second lines, which first and second lines pass through first and last control points of the current trajectory, and which first and second lines are both parallel to said first coordinate direction; and
   c) upon positive results of the first and second testing steps, executing the first assigning and ending processing step.

4. The method as claimed in claim 1, wherein
   a) the second sub-step of the set of determining steps comprises the step of determining whether said actual point is in the brush bounding box when the guiding center of the brush object element coincides with any corner of a non-dilated version of the current trajectory curve bounding box, and, if so, executing, the set of brush steps; and
   b) the set of brush steps comprises the step of testing whether said actual point is outside the brush object element, but in a coherent area that is contiguous with a corner of the dilated box, and in the positive case choosing a new current trajectory curve and executing the set of determining steps.

5. A method as claimed in claim 1, wherein said guiding trajectory is a closed shape, which shape defines said -inside- indication, further comprising the further step of re-executing the set of brush steps using the guiding trajectory curve as a second brush object element, which second brush does not move along a trajectory curve, whereby there is an OR-ing of the brush object element and the second brush object element.

6. A method as claims in claim 5, wherein an -inside- indication generated as a result of executing step e) using the guiding trajectory overrules any -outside- indication resulting from executing step e) using the brush object element.

7. A method as claimed in claim 1, wherein said brush shape has a dimension that is variable in application coordinates for keeping its dimension fixed in display device coordinates under any zooming/dezooming operation.

8. A method as claim in claim 1, wherein said guiding trajectory defines an alfanumerical character.

9. A method as claimed in claim 1, wherein said guiding trajectory interconnect two closed figures.

10. A method as claimed in claim 1, further comprising, for determining whether a first region outlined by a first closed Bezier path is connected with a second region outlined by a second closed Bezier path the steps of:
   a) choosing said second path as said guiding trajectory,
   b) spatially inverting said window with repect to an origin point,
   c) choosing said origin as the guiding center, and a result of said iinverting as the brush object element, d) interpreting any -inside- indication for said origin point to mean that the first and second regions are not connected, and e) repeating the method separately with respect to the first and second regions to give first and second -inside-indications.

11. A method as claimed in claim 1, for use on a multicolor display apparatus.

12. A method as claimed in claim 1, wherein the -inside- or -outside- indication determines character shapes on a text processor device.

13. A method as claimed in claim 1, wherein said brush shape contains a rational Bezier curve, and further comprising the steps of a) a first transforming the rational Bezier curve, by means of conical projection with respect to a second origin is into a non-rational Bezier curve in three dimensions, and b) second transforming the non-rational Bezier curve resulting from the first transforming step, by means of cylindrical projection parallel to a junction line between the second origin and the actual point, into a further non-rational Bezier shape for which the -inside- or -outside- indication resulting from using the second origin is identical to the -inside- or -outside- indication for the actual point with repect to the brush shape.

14. A method as claimed in claim 13, wherein the brush shape contains at least one conic section.

15. A method as claimed in claim 14, wherein said brush shape consists exclusively of conic section parts.

16. A method as claimed in claim 15, wherein such brush shape is a single conic section.

17. A method as claimed in claim 16, wherein said brush shape is a circle.

18. A method as claimed in claim 16, wherein said brush shape is an ellipse.

19. A method as claimed in claim 1, wherein said brush is a rectangle.

20. The method of claim 1, wherein the first sub-step of the set of determining steps comprises the steps of a) determining whether an infinite line which corresponds with said half-line crosses the current dilated box; and b) when thhe infinite line does not cross the current dilated box, disqualifying the current trajectory curve with respect to any actual point on the infinite line when said actual point is outside the current dilated box.

21. The method of claim 20, further comprising the step of computing a width of a beam of parallel contiguous lines of points, which beam comprises said infinite line, which computing step comprises the step of a) mutually AND-ing signals representing dimensions, of those of respective dilated boxes which correspond to non-rejected trajectory curves, perpendicular to said lines; and b) AND-ing i) the signals representing the dimensions, of those of the respective dilated boxes which correspond to non-rejected trajectory curves, perpendicular to said lines; with ii) signals representing dimensions of a complement of the trajectory curve bounding boxes of rejected trajectory curves;

whereby all points within said beam are guaranteed to need only the set of non-rejected curved to compute the -inside-indication and the -outside- indication.

22. The method of claim 20 further comprising assigning a color to the pixel based on said -inside- indication.

23. Apparatus for pixel-wise generating a display picture representing an object set of object elements, the object set including a brush object element and a guiding trajectory, the brush element being a brush shape having a guiding center and being defined by one or more paths each closed path comprising a concatenation of at least one brush curve each of which is a respective Bezier curve, the guiding trajectory comprising a concatenating of at least one trajectory curve, each trajectory curve being a respective non-rational Bezier curve, the guiding center being a point within the brush shape which is moved along the trajectory curve, the apparatus comprising:

a) first storage means for selectably storing a sequence of trajectory control point coordinates and edge coordinates of a brush bounding box;

b) second storage means for storing coordinates values of an actual point corresponding to a current pixel;

c) first calculating means fed by said first and second storage means for calculating relative coordinates of said trajectory control points;

d) first test means fed by said first calculating means for testing each control point of a Bezier curve whether to determine whether the control point lies in a 2 point×2 point square;

e) second calculating means fed by said first storage means and second storage means for calculating relative values of edges of a dilated box which encompasses the brush bounding box when the brush object element is positioned at either end point of the trajectory curve;

f) second test means fed by said second calculating means for testing whether the actual point is outside said dilated box;

g) third calculating means fed by said first calculating means for calculating control points of a divided trajectory Bezier curve and feeding these to said first and second test means upon a negative determination by the first and second test means, whereby the output of the third calculating means causes recursive processing;

h) said apparatus having an output means fed by said third calculating means for outputting processed control points; and i) brush routine processing means coupled to receive the processed control points from the output means.

24. An apparatus as claimed in claim 23, wherein said third calculating means is an array means, coupled to receive respectively pairs of control points from said first calculating means, for concurrently calculating at least two output control points including a respective intermediate point between each of the respective pairs of input control points.

25. An apparatus as claimed in claim 24, wherein said array means has a single line of adders that has a serial pipeline organization and a plurality of parallel outputs.

26. An apparatus as claimed in claim 23, wherein said brush routine processing means has at least a trajectory Bezier curve dividing means in common with said third calculating means.

27. An apparatus as claimed in claim 23, wherein a third storage means is provided to an output of said third calculating means for stackwise storing control points of at least one divided trajectory Bezier curve, for later processing in said third calculating means.

* * * * *